3,636,125
ISOMERIZATION OF BRANCHED CHAIN 1-OLEFIN TO BRANCHED CHAIN 2-OLEFIN EMPLOYING 5A MOLECULAR SIEVES
Frederic H. Hoppstock, Akron, Ohio, assignor to The Goodyear Tire & Rubber Company, Akron, Ohio
No Drawing. Filed Nov. 10, 1969, Ser. No. 875,489
Int. Cl. C07c 5/30
U.S. Cl. 260—683.2
3 Claims

ABSTRACT OF THE DISCLOSURE

There is disclosed a process for the isomerization of 1-olefins to 2-olefins using 5A molecular sieves as a catalyst.

---

This invention is directed to the isomerization of branched chain alpha olefins to form branched chain beta olefins. More particularly, it is directed to an isomerization process whereby branched chain 1-olefins are converted to branched chain 2-olefins by an isomerization process over a catalyst comprising 5A molecular sieves.

Various processes are known in the art for shifting the double bonds of 1-olefins to more internal positions to from internal olefins such as 2-olefins. However, many of these processes produce results or effects which are often undesirable. For instance, some of these prior art processes promote the catalytic polymerization, the catalytic rearrangement of the carbon skeleton or the catalytic degradation of the feedstock and/or the product. Still other of these processes give low conversions per pass and are, therefore, undesirable from that standpoint.

It is the object of this invention to provide a process for the catalytic isomerization of branched chain 1-olefins to form branched chain 2-olefins. It is another object to provide a process which will selectively isomerize branched chain 1-olefins to a branched chain 2-olefin at high reaction rates and high conversion levels and, particularly, at high efficiencies. By the term "efficiencies" is meant that none of the feedstock is wasted, in a sense, by conversion to polymer or to undesirable olefins resulting from skeletal rearrangement.

According to the invention, branched chain 1-olefins are isomerized to branched chain 2-olefins by means of a catalyst system comprising 5A molecular sieves.

The catalysts of this invention which are 5A molecular sieves are well known in the art, as molecular sieves are used in hydrocarbon purification or separation. Chemically, molecular sieves are alumino silicates in combination with certain cations. The cations which are most usually employed are sodium, potassium and calcium. However, other metal ions may be lithium, copper, strontium, rubidium, silver, gold magnesium, zinc, barium, cesium and manganese ions or sometimes cations as ammonium ions are employed.

The molecular sieves of this invention are more specifically a three-dimensional framework of $SiO_4$ ond $AlO_4$-tetrahedra. These tetrahedra are crosslinked by a sharing of an oxygen atom such that the ratio of oxygen atoms to the total of aluminum and silicon atoms is equal to 2. The electro valence of each tetrahedra containing aluminum is balanced by the inclusion in the crystal of a cation, such as sodium, potassium or calcium. The spaces between the tetrahedra are occupied by water molecules prior to the formation of the molecular sieve by means of dehydration. Molecular sieves may be activated by heating to effect a loss of water resulting in crystals interlaced with channels of molecular dimensions.

Molecular sieves are usually prepared by heating a proper mixture of aluminum oxide, silicon oxide and the cation, for instance, calcium. The heating times usually range up to 90 hours at temperatures of about 100° C.

The particular molecular sieves employed in this invention have channels of about 5 angstrom units in diameter and probably can be represented chemically, when in its hydrated form, by the formula:

$$Ca_6(AlO_2)_{12}(SiO_2)_{12} \cdot 27H_2O$$

The conditions required to isomerize a branched chain 1-olefin to a branched chain 2-olefin at about 100% selectivity can be very mild conditions. For instance, a temperature as low as room temperature with the reactant in a liquid phase can be employed. However, even lower temperatures and higher temperatures may be employed. For instance, temperatures from about 20° C. to about 50° C. have given excellent results with the reactant being in a liquid phase.

If one desires to employ a continuous process the liquid hour space velocity (LHSV) may vary widely from about 2 to about 40 volumes of liquid reactant per volume of catalyst per hour. A more preferred LHSV is from about 10 to about 25.

One specific embodiment which appears to be unique is the conversion of 2,3-dimethyl-1-butene to 2,3-dimethyl-2-butene at efficiencies up to 100%. That is, that none of the feedstock or the reactant is converted into polymeric form. It is believed that no other catalyst can obtain such high selectivities in the conversion of 2,3-dimethyl-1-butene to 2.3-dimethyl-2-butene.

The practive of the invention may be specifically illustrated by the following examples which are meant to be construed as illustrative and in no way limiting the invention.

EXAMPLE I

In this example, 2,3-dimethyl-1-butene was placed in a bottle containing 5A molecular sieves having voids or channels of about 5 angstrom units and shaken mildly at room temperature. Every 15 minutes a sample was removed and analyzed by gas liquid chromatographic techniques. The following analysis was obtained:

| Minutes | Percent 2,3-dimethyl-2-butene | Percent polymer formed |
|---|---|---|
| 15 | 76.92 | 0.0 |
| 30 | 91.91 | 0.0 |
| 45 | 92.61 | 0.0 |

EXAMPLE II

In this example, 2,3-dimethyl-1-butene was passed continuously over a fixed bed catalyst consisting of 5A molecular sieves. The isomerization was in liquid phase at 40° C. The procedure ws to establsh a flow rate in liquid hour space velocity (LHSV) and take a sample and analyze it. The flow rate was then changed and the system stabilized to a new LHSV and another sample was analyzed. The results obtained are as follows:

| LHSV | Percent 2,3-dimethyl-2-butene |
|---|---|
| 15 | 86.34 |
| 21 | 78.83 |

To illustrate that other molecular sieves are much inferior to 5A sieves, the following example is presented:

EXAMPLE III

Under conditions identical to Example I, except that 13 X i.e. having voids of about 13 angstrom units, molecular sieves was employed, 2,3-dimethyl-1-butene was isomerized. The results obtained are as follows:

| Minutes | Percent 2,3-dimethyl-2-butene | Percent polymer formed |
|---|---|---|
| 15 | 31.43 | 0.06 |
| 30 | 40.87 | 0.05 |
| 45 | 49.12 | 0.00 |

What is claimed is:

1. The method of isomerizing branched chain 1-olefins to form branched chain 2-olefins which comprises contacting a catalyst of the formula:

$$Ca_6(AlO_2)_{12}(SiO_2)_{12} \cdot 27H_2O$$

with said branched chain 1-olefins in liquid phase at temperatures from about 20° C. to about 50° C. at ambient pressures.

2. The method according to claim 1 in which the isomerization is a continuous one and the space velocity varies from about 10 to about 25 LHSV.

3. The method according to claim 2 in which 2,3-dimethyl-1-butene is converted to 2,3-dimethyl-2-butene.

References Cited

UNITED STATES PATENTS

| 3,467,727 | 9/1969 | Kahn | 260—683.2 |
| 3,475,511 | 10/1969 | Manning | 260—683.2 |
| 3,409,699 | 11/1968 | Mitsche | 260—683.2 |

DELBERT E. GANTZ, Primary Examiner

V. O'KEEFE, Assistant Examiner

U.S. Cl. X.R.

208—46 MS; 260—448 C